United States Patent [19]

Kohl et al.

[11] 4,127,882

[45] Nov. 28, 1978

[54] CHANGE-OVER MECHANISM FOR RECORDING MEDIA, ESPECIALLY FOR FLOPPY DISKS

[75] Inventors: Lambert Kohl, Wachenheim; Richard Schneider, Heidelberg-Neuenheim; Karl Uhl, Frankenthal, all of Fed. Rep. of Germany

[73] Assignee: BASF Aktiengesellschaft, Ludwigshafen, Fed. Rep. of Germany

[21] Appl. No.: 717,537

[22] Filed: Aug. 25, 1976

[30] Foreign Application Priority Data

Mar. 26, 1976 [DE] Fed. Rep. of Germany ....... 2612853
Jul. 22, 1976 [DE] Fed. Rep. of Germany ....... 2632923

[51] Int. Cl.² ............................................. G11B 17/12
[52] U.S. Cl. ................................................... 360/98
[58] Field of Search ..................................... 360/99, 98

[56] References Cited

U.S. PATENT DOCUMENTS

| | | | |
|---|---|---|---|
| 3,846,836 | 11/1974 | Masse et al. | 360/98 |
| 3,931,640 | 1/1976 | Takahara et al. | 360/98 |
| 4,040,107 | 8/1977 | Bryer | 360/99 |

Primary Examiner—Robert S. Tupper
Attorney, Agent, or Firm—Keil, Thompson & Shurtleff

[57] ABSTRACT

A change-over mechanism for disk-shaped recording media, especially for magnetic films in a sleeve, is provided with a magazine and with selector, transport and drive mechanisms which can provide any desired access to any recording medium and permit trouble-free operation. The mechanism can be used for floppy disks and any type of film-like or rigid recording media.

11 Claims, 12 Drawing Figures

CHANGE-OVER MECHANISM FOR RECORDING MEDIA, ESPECIALLY FOR FLOPPY DISKS

The present invention relates to a change-over mechanism for disk-shaped recording media, especially recording media in a rectangular sleeve, for recording/playback of information in a device which comprises a holding and drive mechanism, for the recording medium, which can be brought into the operating position by means of a folding mechanism, and a drive motor for the drive mechanism, and in which the recording medium comes into engagement with the holding and drive mechanism when they are folded towards one another and out of engagement when they are folded away from one another.

In the known data write/read devices — especially the drive devices for floppy disks — the recording media (hereinafter referred to as diskettes) are individually manually introduced into the device, to carry out the data processing, and withdrawn from the equipment.

The diskette consists of a round magnetic film contained in a square flat sleeve. The film and the sleeve possess, in their center, circular cut-outs of different diameters. As a result, the film can be centered in the device by using the smaller diameter of hole and can, by inwardly folding a flap carrying a splaying cone against the driver catch of the device drive, be caused to rotate, thereby permitting the write/read process to be initiated. The sleeve is held firmly and cannot rotate with the diskette. In order to introduce or withdraw a diskette, the flap must always be open, since otherwise the splaying cone blocks the path of the diskette. The selection of the diskettes to be introduced, the opening and closing of the flap, and the manual introduction and withdrawal, are time-consuming and require constant attention to the device by an operator.

U.S. Pat. No. 3,846,836 has disclosed a loading/unloading mechanism for the said diskettes. This mechanism consists essentially of a hopper-shaped storage container for the diskettes, separating mechanisms for isolating the individual diskettes, a transport unit, comprising rolls which can be motor-driven in two directions, for transferring the diskettes into the device, and the write/read device itself, which can be folded together to bring it into operation. The transport unit and the device each have their own drive motor. For the purpose of taking up and driving the diskette, the device has the splaying cone already referred to above and a drive member, driven by the motor of the device, which co-operates with the said cone after the mechanism has been folded together.

The individual diskettes are only accessible in series. The transport unit, constructed as a pair of rolls and fitted with its own motor, can cause damage to the sleeve and/or to the sensitive magnetic film.

German Published Application No. 21 19 418 discloses a magazine and a corresponding device for the write/read operation of data cards, especially punched cards. The magazine contains the data carriers in the form of a stack, and after placing the magazine on the device the lowest card is withdrawn, through a discharge aperture, by withdrawal means provided on the device and engaging through the bottom of the magazine, and is introduced into the write/read device and subsequently re-deposited on top of the stack in the magazine, through an infeed aperture. The infeed and discharge apertures can be closed by a sliding-door type of unit. In this device, once again, the diskettes are only accessible in series. Filing is hardly possible, due to the disadvantageous construction of the magazine, and compact stacking for filing is undoubtedly not possible. The means of withdrawal of the diskettes, provided on the device, are once again friction rolls and these can cause damage to sensitive recording media since the weight of the roll which is above the recording medium to be withdrawn rests on the latter.

It is an object of the present invention to provide a change-over device for disk-shaped recording media, especially for recording media referred to as "floppy disks" without incurring the disadvantages of the conventional write/read devices which employ magazines, but providing the possibility of access, as desired, to any one of a plurality of recording media.

We have found that this object is achieved by a change-over mechanism for disk-shaped recording media, especially recording media in a rectangular sleeve, for recording and/or playback of information in a device which comprises a holding and drive mechanism, for the recording medium, which can be brought into the operating position by means of a folding mechanism, and a drive motor for the drive mechanism, and in which the recording medium comes into engagement with the holding and drive mechanism when they are folded towards one another and out of engagement when they are folded away from one another, wherein is provided a transport mechanism, by means of which the recording medium can be transported, between the holding mechanism and the drive mechanism, substantially at right angles to the plane of motion of the folding mechanism, to execute a to and fro motion into and out of the operating position, and a motion mechanism which is so located between the folding mechanism and the transport mechanism, and is so coupled therewith, or capable of coupling therewith, that by means of the motion mechanism both the to and fro motion of the transport mechanism and the drive of the recording medium in the operating position can be initiated at the correct time, as a function of the position of the folding mechanism.

This provides a very simple change-over mechanism by making advantageous use of the folding mechanism as a time-determining and path-determining central unit, which, with the aid of a suitable motion mechanism, ensures trouble-free fully automatic operation — requiring no servicing — of the mechanism.

This furthermore makes it possible to provide an advantageous change-over mechanism for disk-shaped recording media, as an attachment to conventional data devices. Furthermore, the change-over mechanism can be manufactured very economically, which is clear, for example, from the advantageous utilization of the existing device drive also for the transport mechanism of the recording medium. Furthermore, the invention makes it possible to withdraw any individual recording medium at will, by automatic operation, from a magazine having theoretically an unlimited capacity, and subsequently to return this recording medium.

It is also very advantageous to provide both the folding mechanism and the motion mechanism with a separate motor, each motor being synchronously controlled in accordance with the instantaneous operating condition of the other motor.

In a further embodiment of the change-over mechanism according to the invention, the motion mechanism can comprise a variable-position body, in particular a swivel plate. This permits particularly simple coupling of the drive motion and transport motion, in the correct direction and with correct timing.

In a further practical embodiment, a rotary drive mechanism, driven exclusively by a single drive motor, can be provided on the variable-position body, the said rotary drive mechanism being in engagement with a lengthwise-displaceable element of the transport mechanism.

The motion mechanism can also advantageously be so constructed, and be so coupled to the transport mechanism and to the sole drive motor, that the transport mechanism for the two opposite to and fro motions is driven, at least predominantly, by tapping off a drive motor operated exclusively in a single direction of rotation. This avoids any energy-consuming change in direction of rotation.

In an advantageous embodiment of the mechanism according to the invention, the folding mechanism is drive-coupled to its own drive member, preferably a separate electric motor.

Furthermore, according to the invention, means of blocking can advantageously be provided on the transport mechanism, these means being so located relative to the holding mechanism and drive mechanism, that only in one position of the transport mechanism is the holding and drive mechanism transferable into the position of operation of a recording medium, whilst in all other positions of the transport mechanism the holding and drive mechanism is prevented, by the means of blocking, from arriving in the operating position.

This makes it possible to achieve satisfactory correctly timed infeed/discharge operation and write and/or read operation.

In a simple practical embodiment, the rotary drive mechanism of the change-over mechanism according to the invention comprises a friction wheel on the variable-position body, whilst the lengthwise-displaceable element possesses, on the transport mechanism, a bar of U-shaped cross-section, the arms of the U being a greater distance apart than the diameter of the friction wheel.

According to the invention, a further advantageous measure is to provide a slipping clutch between the rotary drive mechanism and the drive motor.

Yet a further advantageous embodiment of the mechanism according to the invention is to provide a coupling member, preferably a control pin, on the swivel plate, which coupling member actuates the friction clutch in the sense that in the operating position of the foldable holding and drive mechanism the drive motor serves exclusively to drive the recording medium and not to move the transport mechanism. As a result, the write/read operation is able to employ the full drive power, and an automatically controlled drive change after the write/read operation can be effected without effort.

A very advantageous change-over mechanism according to the present invention is provided by an embodiment wherein a separate drive member is provided for the holding and drive mechanism, which member effects, in the conventional manner, the folding motion of the folding mechanism within the predetermined time sequence, and a transport mechanism for the recording medium is provided, the transport motion of which is generated by a motion mechanism, the folding motions of the holding and drive mechanism and the motions of the transport mechanism being coupled but taking place at different periods of time, and the transport motions for the recording medium, in two opposite directions, being generated, by means of the motion mechanism, at least predominantly by tapping off the drive motor of the device, which is run exclusively in one direction of rotation only.

In a further advantageous variant according to the invention, the folding mechanism and the motion mechanism each have a separate drive motor, each of which is controlled in accordance with the instantaneous operating condition of the other motor, and the drive motor of the motion mechanism drives a friction wheel via a friction clutch, and the transport mechanism has a lengthwise-displaceable rail, the to and fro motions of the transport mechanism being determined by the particular direction of rotation of the friction wheel in contact with the rail.

Details of the change-over mechanism according to the invention are described below in relation to the embodiments shown in the drawing. In the drawing:

FIG. 5 and 5a shows the mechanism according to FIG. 4, in the half-open position, FIGS. 7 and 7a to 9 show the mechanisms according to FIGS. 4 to 6 in plan view.

Figure 1:
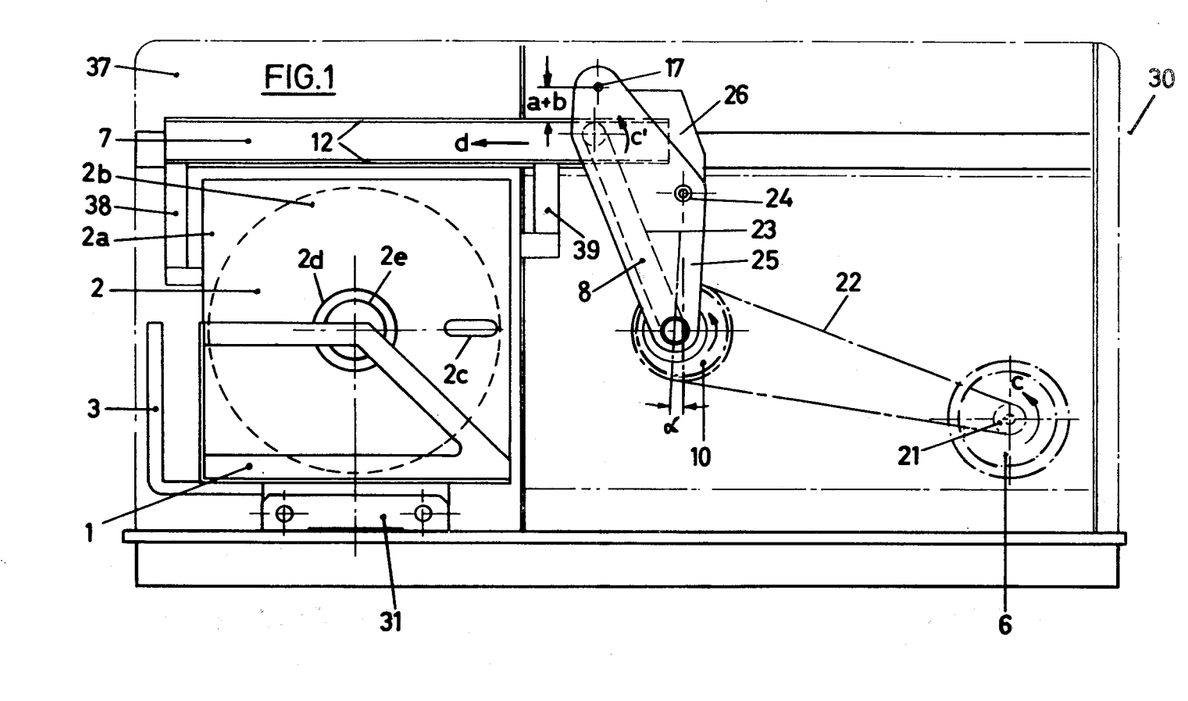
FIG. 1 shows a change-over mechanism in side view, with a magazine which still contains at least one diskette.
Figure 2:
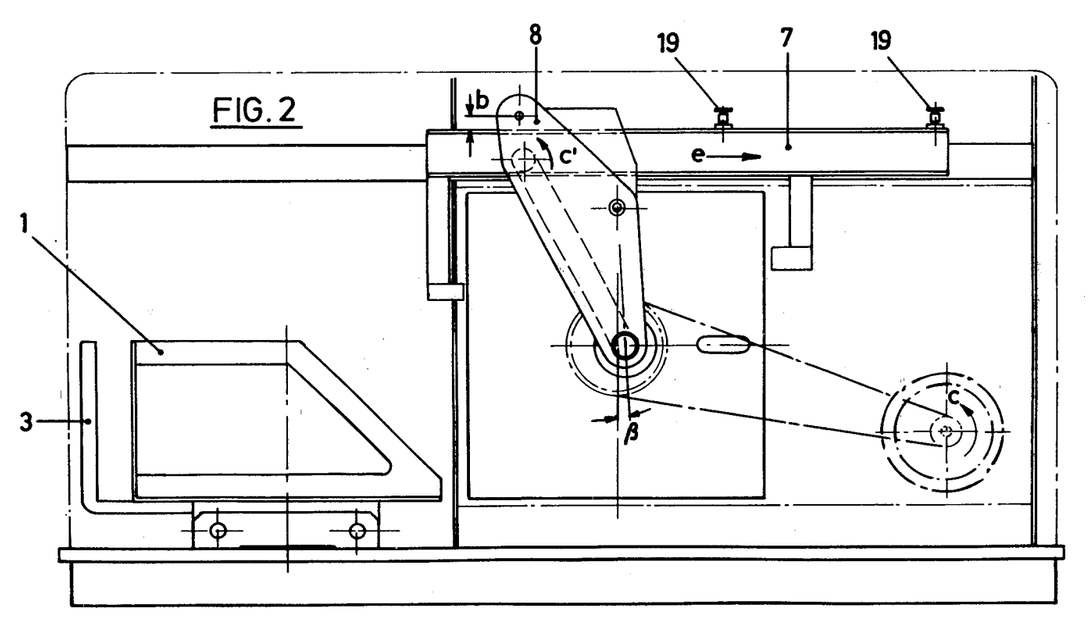
FIG. 2 shows a change-over mechanism according to FIG. 1 with a diskette already in the device.

A change-over mechanism 30 is described, together with a magazine 1, which is movable on a suitable carriage mechanism 31 relative to a write/read device 40 for the recording media stored in the magazine 1 and hereinafter referred to as diskettes 2. The magazine 1 and the carriage mechanism 31, the latter essentially consisting, in the present case, of a drive motor 4, the actual carriage 32, a carriage guide 33, a belt drive 34 which engages on the carriage 32, the intermediate wheel 35 and a drive belt 36, are to be regarded as a simple unit which is shown schematically in the figure. Of course, other types of containers for recording media and other types of units for producing a relative displacement motion between the memory and the device can be employed. It is merely necessary that the container, i.e. the magazine 1, can receive several recording media, e.g. the diskettes 2. The latter are shown in FIGS. 1 and 2. They are approximately square sleeves 2a containing circular magnetic films 2b, which latter are shown in broken lines. A radial slit 2c permits scanning of the tracks of the diskette 2 if a magnetic head, not shown in the figure, is provided in this zone and is brought into contact, by conventional methods, with the magnetic surface of the film 2b. Circular cutouts 2d and 2e in the sleeve 2a and the film 2b permit engagement in the device in order to provide the drive.

Figure 3:
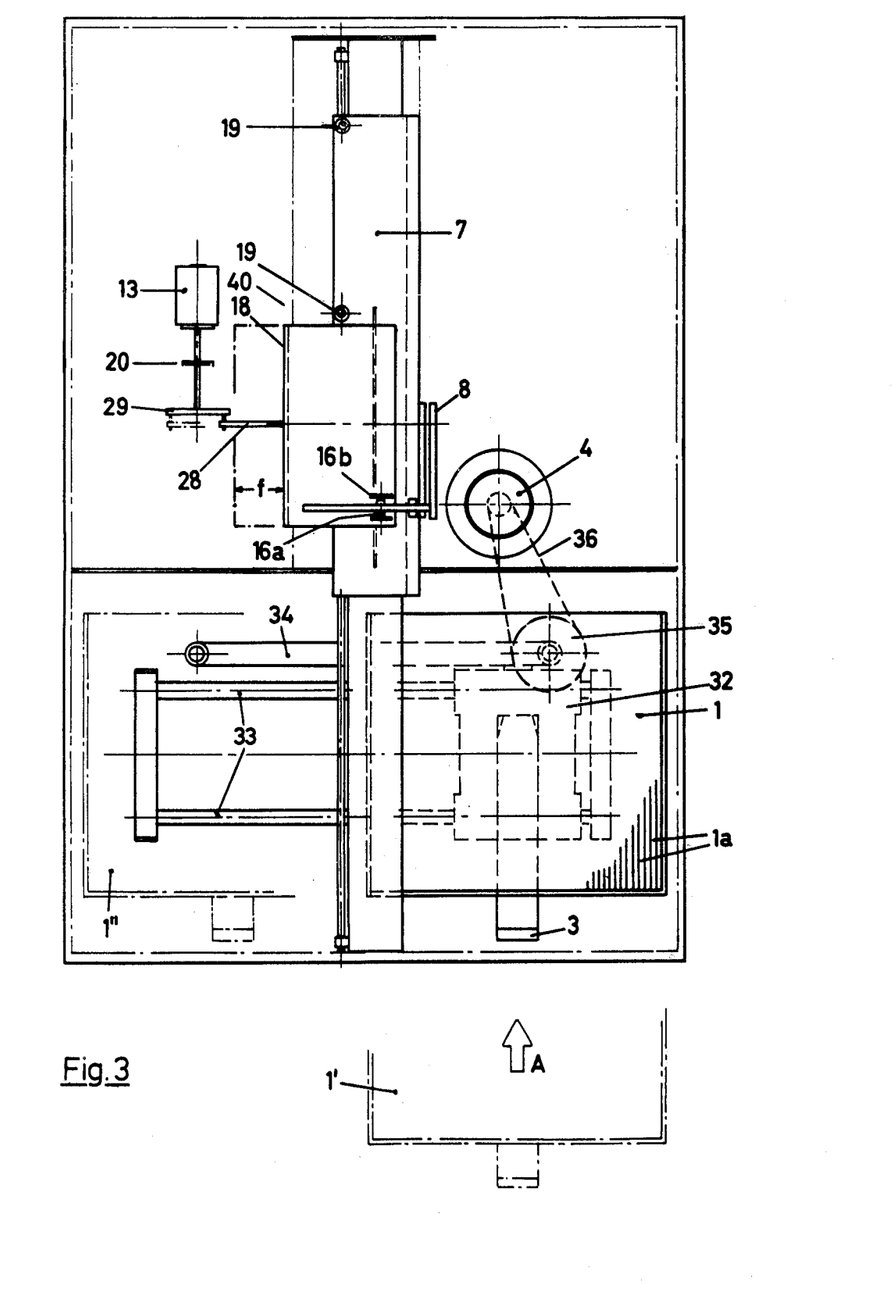
FIG. 3 shows the change-over mechanism, with the magazine filled with diskettes, in plan view.

As indicated, for example, in FIG. 3, the magazine 1 possesses a plurality of compartments 1a for the diskettes 2, a grip 3 for handling the magazine, and suitable means, not shown in the figure, for locking the magazine to the carriage 32.

The arrow A in FIG. 3 shows the direction of insertion of the magazine 1 from a position 1', shown in broken lines, outside the device, though the magazine can of course also be inserted at right angles to this direction, e.g. from the right, from the left or from above. The means of locking between the magazine 1 and the carriage 32 can be constructed accordingly. Whilst, on the right-hand side, the magazine 1 is shown in solid lines in its initial position, the final position 1" is shown in broken lines on the left-hand side.

Advantageously, the magazine 1 is at least partially screened from its environment by the device housing whilst the said magazine is in its operating position. A plurality of compartments 1a can advantageously be provided, so that fully automatic write/read operation becomes possible, for example by means of a control mechanism which can be programmed.

The carriage mechanism 31 does not serve to withdraw individual diskettes 2 from the magazine 1 and return them; instead, in the embodiment shown, this operation is effected by a transport mechanism 37 which essentially comprises an element mounted so as to be displaceable from right to left, and vice versa, in FIGS. 1 and 2, namely a guide arm 7, which is advantageously provided with a U-rail 12 and grippers 38 and 39 suitably fixed thereto. The grippers 38 and 39 are shown schematically and in practice must be so constructed that at least one gripper can reach into the magazine 1 between two adjacent diskettes 2 and can nevertheless withdraw one of the two diskettes without damaging it. For simplicity, the grippers 38 and 39 are in the present case shown as rectangular pieces. In FIG. 1, the diskette 2 to be withdrawn is still in the magazine 1, but the grippers 38 and 39 are already in their withdrawing position, e.g. they have already been moved towards the magazine 1. In contrast, FIG. 2 shows the same diskette which, as can be seen, happened to be the only diskette in the magazine 1, already in its operating position. In this operating condition, the magazine 1 is advantageously locked in the position from which the diskette was withdrawn, so as to be able to ensure that the latter can be returned into the same magazine compartment 1a.

The text which follows describes how the lengthwise displacement of the diskette 2 and of the transport mechanism 37 can be brought about.

Figure 4:
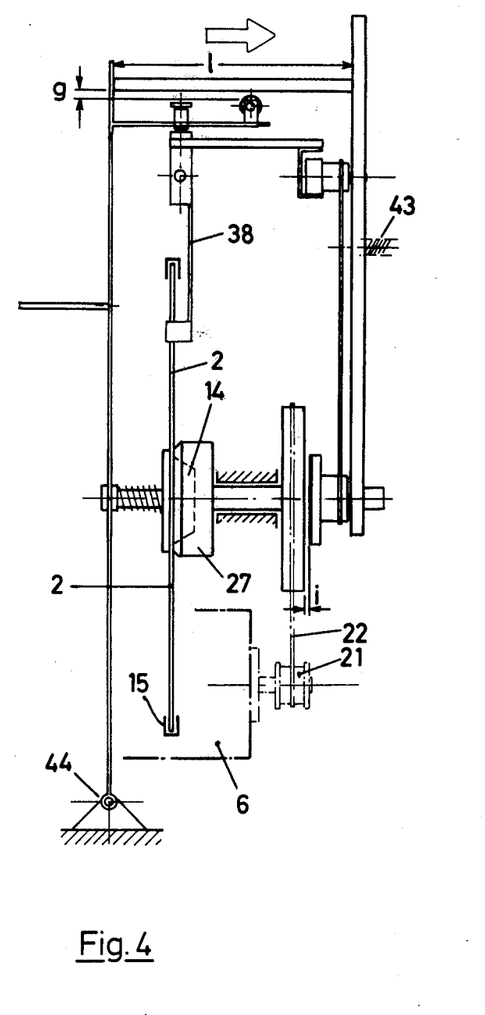
FIG. 4 shows a schematic cross-section of the foldable holding and drive mechanism of the write/read device in the position of operation of a diskette.

The write/read device 40 includes a drive motor 6 for rotating the diskette 2 during the write/read process. A belt pulley 10 of the device 40 is driven by the belt drum 21 on the motor shaft, via a drive belt 22. At the same time, as can be seen from FIGS. 4–6, a friction disc 9 is also driven, to a greater or lesser degree, via a friction layer which in practice is, for example, a felt disk 41. The disk 9 is connected, via a belt 23, to a friction roller 11, e.g. a rubber roller, which, as is clearly shown in side view in FIGS. 4 and 6, is always in moving contact with the lengthwise-displaceable element 7 of the transport mechanism 37, in the present case with one of the arms of the U-rail 12 of the transport mechanism 37. The motion sequences which result are made clear in FIGS. 1 and 2. In the case of the assumed direction of rotation (arrow c) of the drive motor 6, which is in the present case advantageously the sole direction of rotation, the friction disk 9 is driven in the same direction of rotation and the friction roller 11 is again driven in the direction of rotation of the motor (arrow c'). The frictional contact of the friction roller 11 of the upper arm of the U-rail 12 imparts to the latter, and hence to the transport mechanism, a motion in the direction of the magazine 1 (arrow d, FIG. 1) for the process of extracting or discharging the diskette 2. FIGS. 1 and 2 shows, for the same directions of rotation of the drive motor 6 (arrow c), of the friction disk 9 (arrow c) and of the friction roller (arrow c'), which is now, however, in frictional contact with the lower arm of the U-rail, that now a lengthwise motion (arrow e), opposite to the lengthwise motion represented by the arrow d, of the transport mechanism 37 is produced, for the insertion or loading of the diskette 2. It follows from the above that in the embodiment shown it is possible, by means of a single motor which is in any case present in the conventional write/read devices, to produce, in addition to the conventional write/read drive, a transport motion for the automatic loading and unloading of the recording medium. The actual reason for the conversion, described above, of the rotary motion of the motor into two lengthwise motions of opposite direction is the change of contact of the friction wheel 11 from the upper to the lower arm, and vice versa, of the U-rail 12 of the transport mechanism 37. The change in the height position of the friction wheel 11, which this requires, is brought about by the change in position of a variable-position body and, as shown, by the tilting motion of a swivel plate 8. A control pin 17 is provided on the swivel plate 8. On comparing the height positions of the control pin 17 in FIGS. 1 and 2, in each case measured from the upper edge of the U-rail 12, it is seen that the height in one case is $h = a + b$, whilst in the other case the height is $h' = b$. From a comparison of the positions of the swivel plate in FIGS. 1 and 2, the angular position (angle $\alpha$ in FIG. 1 and $\beta$ in FIG. 2) can be deduced in each case. The swivel plate 8 is of approximately triangular shape and is mounted tiltable about an axis of tilt 24 in the vicinity of the apex of the triangle. The text which follows explains the way in which the up and down motion of the swivel plate 8 is controlled.

The reference numbers used hitherto are employed below to identify the same parts.

The elements, explained above, the swivel plate 8, the friction disk 9, the belt 23 and the friction roller 11 are hereinafter also referred to as the rotary drive mechanism 25.

The motion mechanism 26 is taken to include the swivel plate 8, the friction roller 11, the friction disk 9, the belt pulley 10 and the device drive motor 6.

The transport mechanism 37 comprises the guide arm 7 with the U-rail 12 and the grippers 38 and 39.

The foldable holding and drive mechanism, which together with the folding mechanism essentially makes up the write/read device 40, consists essentially of the conically recessed head or hollow cone 27 on the drive spindle or carrier shaft 5, on which the driven belt pulley 10 is also fixed, the conically shaped clamping element or splaying cone 14, designed to correspond to the shape of the hollow cone 27 (FIG. 4) and between the two the recording medium (FIG. 5), e.g. the diskette is kept in operation and driven, the actual folding mechanism, the flap 18 and, of course, a write/read head, which for simplicity is not shown. The flap 18 carries the splaying cone 14 on one side and is driven, from the other side, by a lever system 28, which is connected via an eccentric pulley 29 and a slipping clutch 20 to a folding mechanism drive motor 13. The double arrow f in FIG. 3 shows the available motion of the flap 18, shown in broken lines in the open position and in solid lines in the operating position. A lid 42 is attached, approximately at right angles, at the top of the flap 18. The lid 42 carries, on its upper face, the control roller 16 which, as shown, for example, in FIG. 3, is rotatably mounted between bearing members 16a and 16b. As will emerge from the description which follows, the lid 42 serves several purposes, namely firstly a protective function, secondly a time control function and thirdly a space control function. The time control function will now be explained with the aid of FIGS. 3 to 6 and the space control function with the aid of FIGS. 7 to 9.

In the preceding description of FIGS. 1 and 2, the mechanism whereby the tilting of the swivel plate 8, which, as explained, determines the particular direction of the transport motion, is brought about has not yet been dealt with. As shown in FIG. 3, the control roller 16 is so arranged, in accordance with the position of the control pin 17 (FIG. 1) that in a predetermined position of the flap 18 the pin 17 and hence the swivel plate 8 are raised or lowered in order to achieve the height difference a. In FIG. 3, the flap 18 is closed, which corresponds to the position shown in elevation in FIG. 4. Between the control roller 16 and the control pin 17 there is a gap g, calculated from the periphery of the roller 16. In this position, the device 40 is in operation with a diskette 2, since the parts intended to engage with the circular aperture 2e in the film 2b namely the splaying cone 14 and the hollow cone 27, are in contact with one another and with the film 2b. The drive motor 6 drives the hollow cone 27 directly via the belt pulley 21, belt 22 and shaft 5, so that the splaying cone 14 rotates the film 2b in its sleeve 2a. Guide rails or holding rails 15 for the sleeve 2a are indicated as U-shaped parts above and below the diskette; other means of holding are not shown in the drawing. In this operating position in FIG. 4, the function of the friction clutch between the belt pulley 10 and the friction disk 9 will now also become clear. A gap i results between the belt pulley 10 and the felt disk 41, so that the drive of the motor 6 fully benefits the device 40 and the rotary drive mechanism 25 is stopped, so that the transport mechanism 37 cannot come into motion. This advantageous function is achieved by making the control pin 17 a suitable length 1, so that when the flap 18 is closed the flap, in co-operation with the pin 17, makes the rotary drive mechanism 25 inoperative, for example by lifting the felt disk 41 off the belt pulley 10 or by at least suitably reducing the friction between them. The friction arrangement has the further advantage that even without additional precautions, neither the device nor the diskette can be damaged by a blockage, or in the end position of the transport mechanism 37, since the felt disk 41 slips. The swivel plate 8, to which the control pin 17 is fixed, at right angles to the surface of the plate, is supported on the other side by means of a schematically shown spring 43. As a result, the spatial co-ordination of the parts intended to co-operate, namely 18 and 17, 16 and 17, 12 and 11, and 10 and 41, remains preserved trouble-free in the relevant positions.

In the operating position of the device 40 (FIG. 4), the friction roller 11 rests against the lower arm of the U-rail 12, which shows that the motion mechanism 26 is still in the feed-in or loading position though the feed-in or loading process has already ended. In this position, the swivel plate 8 is in the position shown in FIG. 2.

Figure 5:
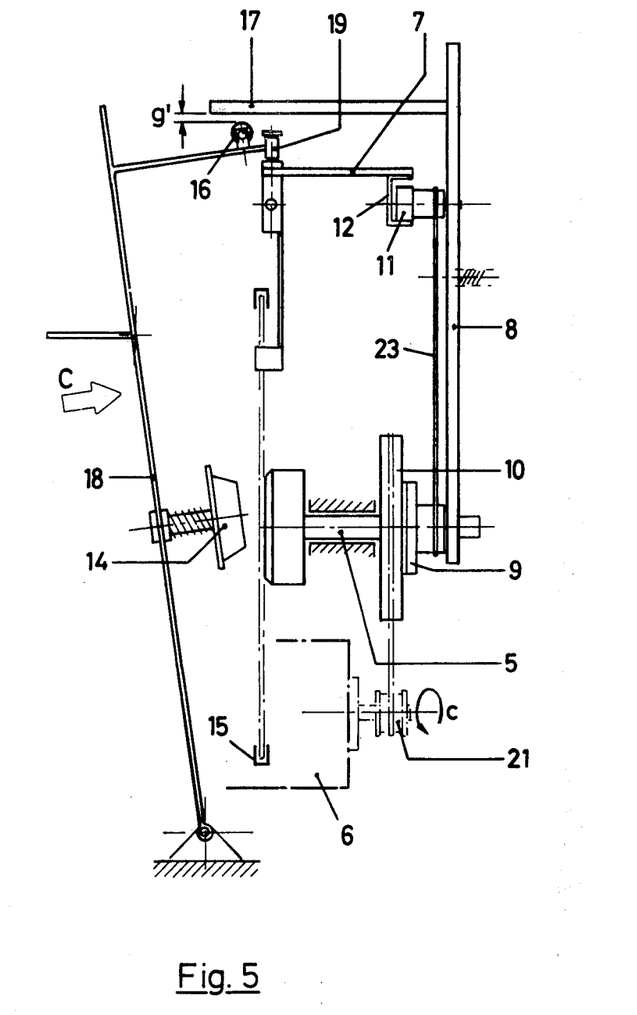
Figure 6:
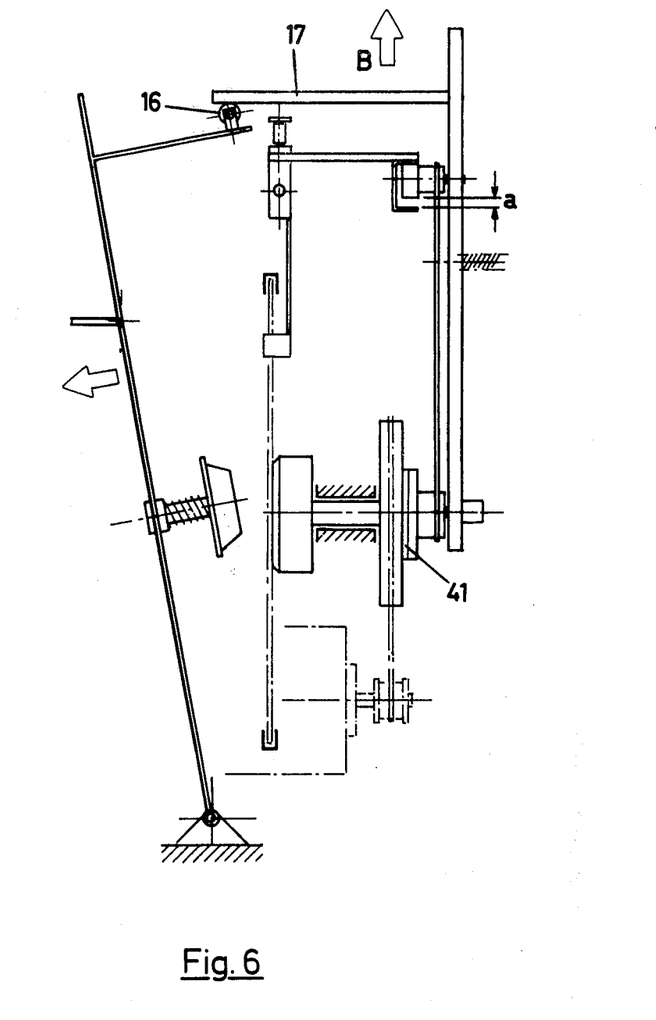
FIG. 6 shows the mechanism according to FIG. 4 in the open position.

The flap 18, which is hinged by means of the hinge 44 to the device chassis, which is not shown, assumes different positions in FIGS. 5 and 6. FIG. 6 shows the position in which the device is free for loading a diskette 2. Here, the flap 18 has been tilted back by a distance f (FIG. 3). The control roller 16 is now in contact with the control pin 17 and, as indicated by the arrow B, the pin 17 and the swivel plate 8 have been raised by an amount a. The operating position of the device thus corresponds to the arrangement in FIG. 1. The lift by an amount a has transferred the arrangement into the unloading position, in which the flap 18 is opened and the transport mechanism is moved in direction d towards the magazine 1. In contrast, FIG. 5 shows an intermediate position between the terminal positions of the flap 18 in FIGS. 4 and 6. Here, the flap 18 itself no longer rests against the pin 17, so that the belt pulley 10 is in engagement with the felt disk 41 and hence with the friction disk 9. The control roller 16 is not yet in contact with the control pin 17 [see the motion-indicating arrow C and the distance g' g (FIG. 4)], so that the swivel plate 8 assumes a position for loading a diskette 2, in accordance with FIG. 2. The length of time for which the path for loading/unloading of the diskette remains open can be adjusted by suitable choice of the speed of the flap and the arrangement and construction of the control roller 16 and of the control pin 17.

The above description explains how the time sequence of the motions of the mechanism can be realized in practice; they ensure that the diskette is correctly introduced into, and extracted from, the device 40, without the individual units interfering with one another.

A brief explanation will now be given, in relation to FIGS. 7 to 9, of how the spatial co-ordination of the device 40, transport mechanism 37 and diskette 2 can be made reliable for automatic operation.

Figure 7:
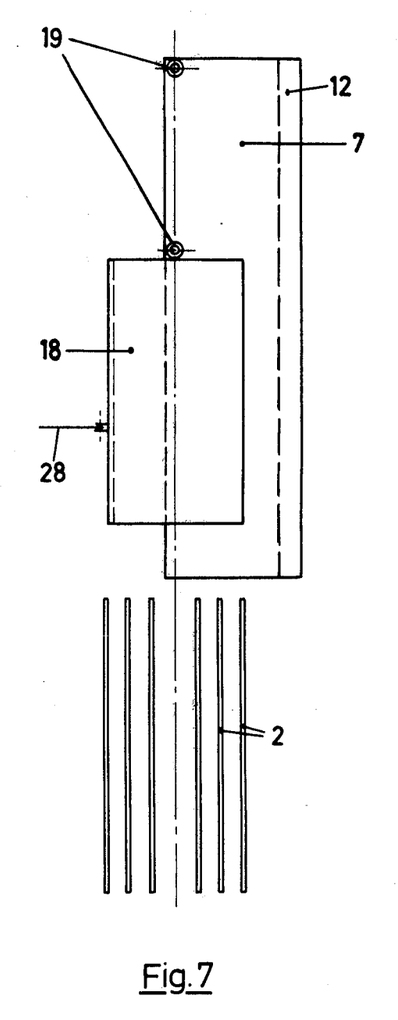
Figure 8:
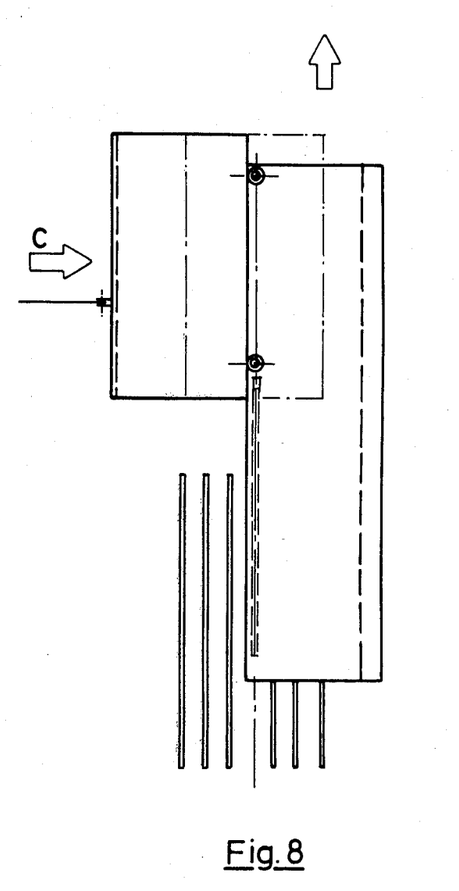
Figure 9:
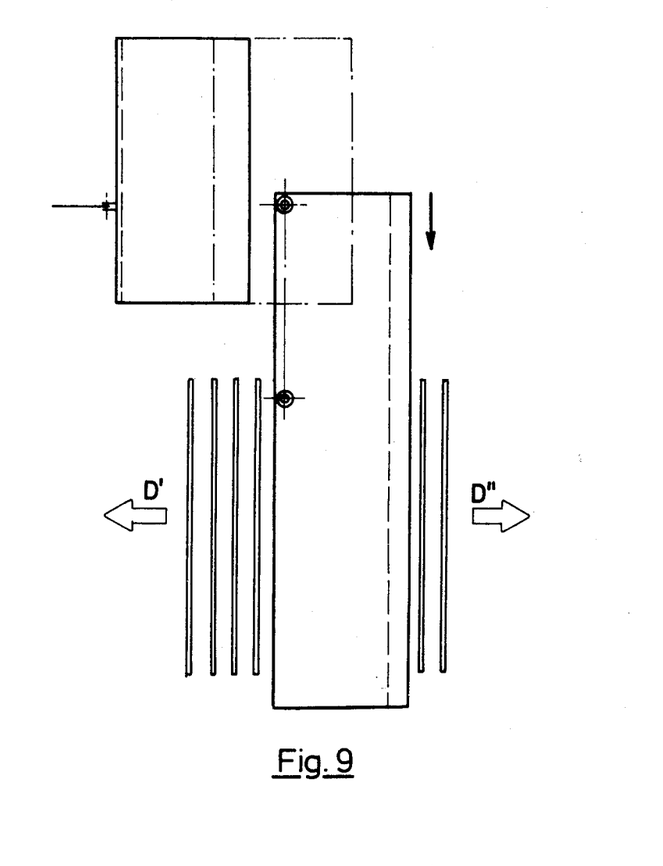

The plan views in FIGS. 7 to 9 essentially correspond to the respective operating positions of the device in FIGS. 4 to 6.

In order to prevent the flap 18 of the device 40 from, for example, flapping back into the operating position shown in FIG. 4 whilst the loading or unloading motion of the transport mechanism 37 is still taking place, means of blocking are provided, constructed as blocking rollers 19 on the upper face of the guide arm 7 of the transport mechanism 37. These blocking rollers 19 are so arranged relative to one another and relative to the flap 18 or, more precisely, the lid 42 that only in the operating position (FIGS. 4 and 7) do the rollers 19 allow the lid 42 to pass unhindered. In the positions according to FIGS. 5 and 6, in which loading or unloading sequences are still taking place, the rollers 19 block the path of the lid 42 and hence block the flap 18 in its operating position, as shown in FIGS. 8 and 9. These figures do not show the magazine, but simply show a series of disks 2 in a pack arrangement. The arrows D' and D" show the possible directions of travel of the stored diskettes 2, and this once again makes it clear that access is possible at any desired point, even when using any desired container for the recording media.

Figure 5A:
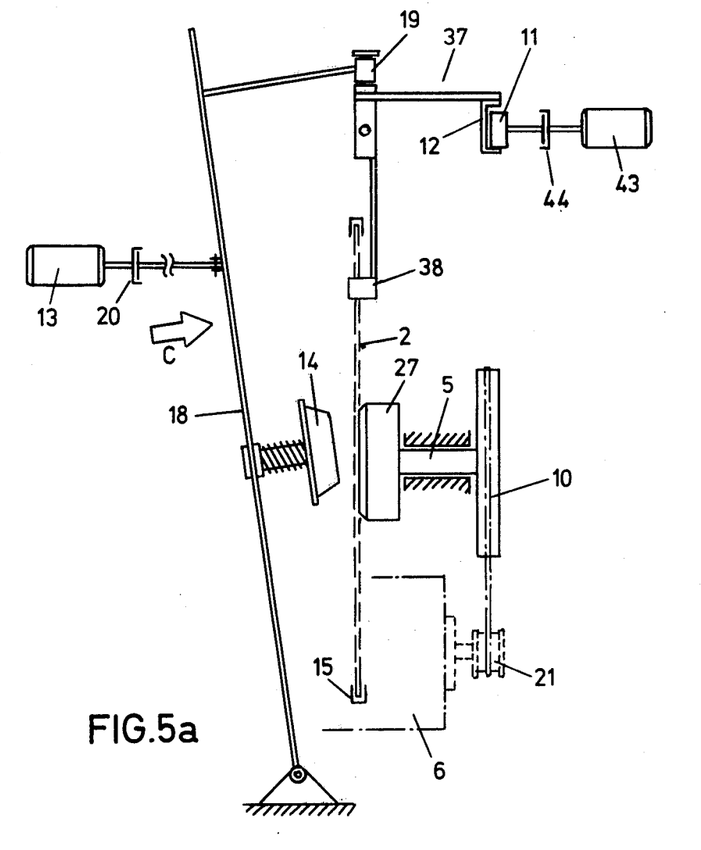
FIG. 5a shows a variant of the mechanism according to FIG. 5.
Figure 7A:
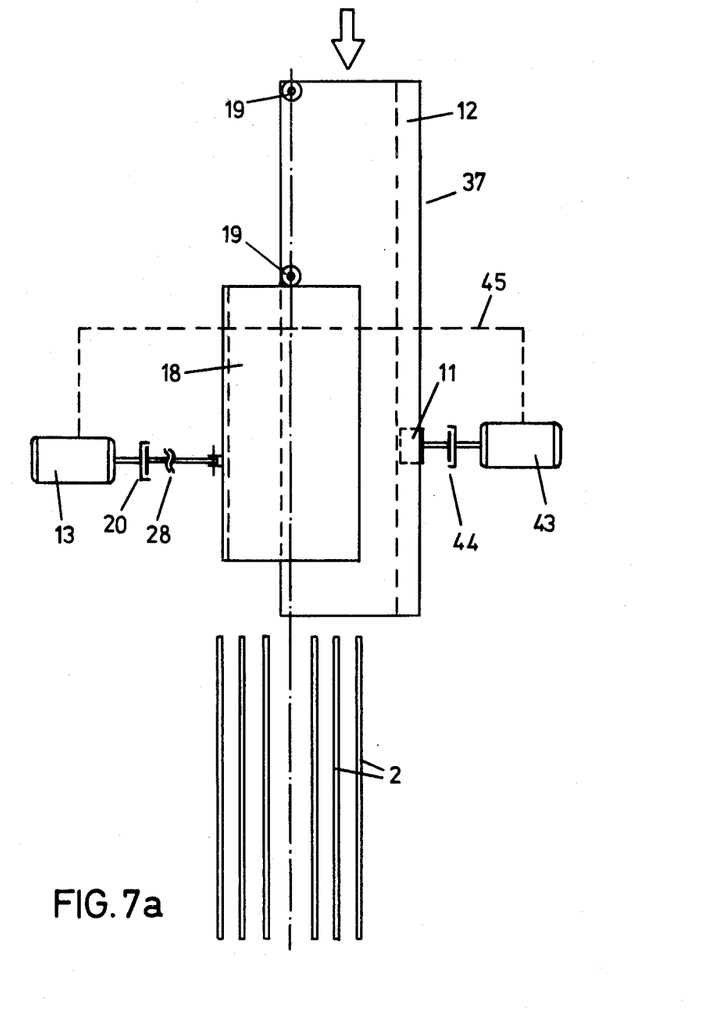
FIG. 7a shows a variant of the mechanism according to FIG. 7
Figure 8A:
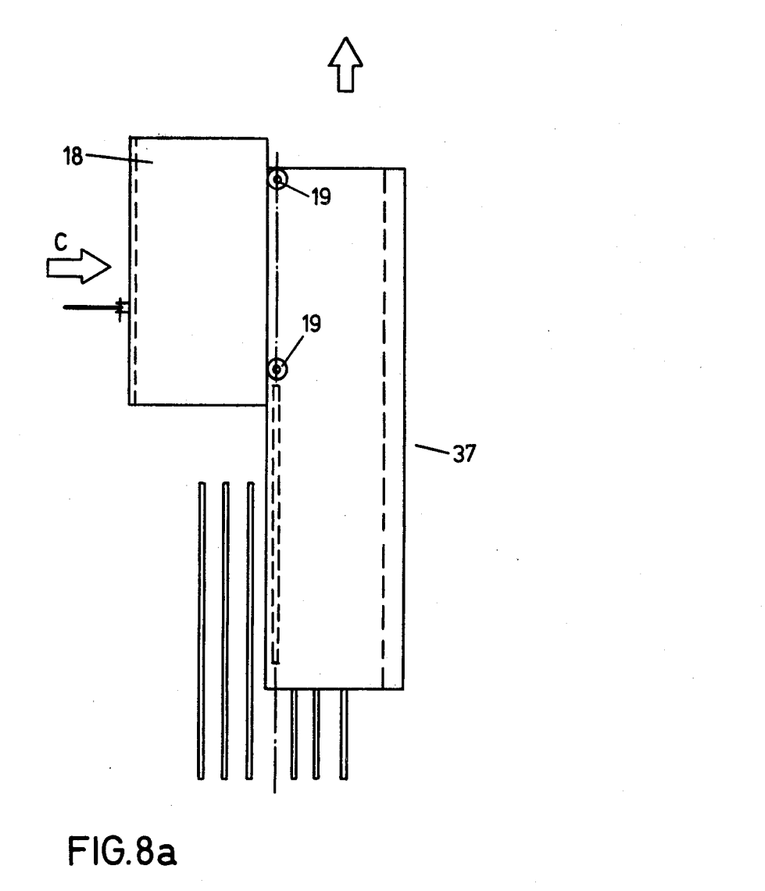
FIG. 8a shows a variant of the mechanism according to FIG. 8.

FIGS. 5a, 7a and 8a show a further embodiment of the change-over mechanism according to the invention. The corresponding parts of the mechanism are marked with the same reference numbers as in the corresponding FIGS. 5, 7 and 8.

In FIG. 5a, the pin 17, the control roller 16, the swivel plate 8 and the belt 23, that is to say essentially the parts described as forming the motion mechanism, are absent.

In this case, the transport motions, in the two opposite directions, of the recording media are derived from a gear motor 43 which can be driven in either direction of rotation and which drives the friction wheel 11 directly, advantageously via a friction clutch 44. As is made clear by the action link shown as a broken line (line 45 in FIG. 7a), this motor 43 is connected to the motor 13 for the folding motion in such a way that the two motors are always switched on and off simultaneously. Accordingly, the motor 43 is controlled by the folding motion, so that the closing of the flap and the inward motion of the transport mechanism, and the opening of the flap and the outward motion of the transport mechanism, are respectively switched on simultaneously, and accordingly the motions take place in the correct time sequence, as explained below. The means of blocking, namely the rollers 19, prevent — as shown in FIGS. 7a and 8a — the outward motion of the transport mechanism (FIG. 7a) and the closing of the flap 18 (FIG. 8a) until the path is released by the respective other unit, in co-operation with the small roller 19 (i.e. in the one case co-operation between the flap 18 and the small roller 19 and, in the other case, between the transport mechanism 37 and the small roller 19). As long as this path is not released, the friction clutch 20, 44 provides friction between the motor 13, 43 of the particular impeded unit (18 or 7), and the unit itself, and thereby ensures timewise staggering of the motions.

It is of course also possible to record the relative positions of the flap and of the transport mechanism directly, e.g. by photocell arrangements and the like, and thereby to switch the motors 13 and 43 at the correct times. In that case, the small roller 19 and the friction clutches 20 and 44 can be dispensed with.

The preceding description has concerned itself with a change-over mechanism for disk-shaped recording media in relation to a practical embodiment in which a floppy disk device can be charged automatically with diskettes from a magazine, with no restriction on the diskette selected. This, or a similar mechanism, can be employed advantageously for all kinds of disk-shaped, especially flexible, recording media, which also include video disks. The control of the automatic diskette withdrawal and return can be effected with any suitable program controlled unit. It is also possible to replace the mechanical control elements used in most cases in the embodiment described, by combinations of electromagnetic or photoelectric components, without thereby exceeding the scope of the claims.

We claim:

1. In a record-changing apparatus for disk-shaped recording media in which, incident to a record-changing operation, one of a plurality of recording media is positioned in a standby position, a loading and unloading arrangement for moving said recording medium to or from an operative position in a recording and playback device, said device including a drive spindle having a conically recessed head, a pivotally mounted flap carrying a conically-shaped clamping element cooperating with said head, and actuating means for pivoting said flap with said clamping element thereon from a normal angular position in a direction towards said head so as to clamp said recording medium, when in said operative position, against said head and hence into effective driven engagement by said spindle, or vice versa, said arrangement comprising:
means for transporting said recording medium from said standby position to said operative position, and vice versa, at right angles to the plane of motion of said flap,
drive means for driving said drive spindle and said transporting means, and
control means mechanically interposed between said flap and said transporting means, said control means including
start-stop means mechanically controlled by said flap, when pivoted from its actuated to its normal position, to couple said transporting means to said drive means, and mechanically controlled by said flap, when pivoted from its normal to its actuated position, to uncouple said transporting means from said drive means, and said control means also including
direction-control means mechanically controlled by said flap, when in its normal position, to condition said transporting means for movement in the direction toward said operative position, and controlled by said flap, when in a position other than said normal position to condition said transporting means for movement in the opposite direction.

2. An arrangement as claimed in claim 1, wherein said drive spindle and said transporting means are driven by a common, unidirectional motor and wherein said control means comprise a variable-position member.

3. An arrangement as claimed in claim 2, wherein said transporting means comprise a longitudinally translatable element and wherein said variable-position member carries a rotating member driven by said unidirectional motor in always the same sense for longitudinally moving said translatable element in the first- or second-mentioned direction as determined by the position of said variable position member.

4. An arrangement as claimed in claim 3, wherein said rotating member is driven by said unidirectional motor through the medium of a friction clutch.

5. An arrangement as claimed in claim 3, wherein said variable-position member is supported for movement in two mutually perpendicular planes, and wherein said flap has two control elements, said variable position member, in response to movement in the first of said planes under the control of the first of said control elements, rendering the drive of said transporting means by said unidirectional motor effective or ineffective, and in response to movement in the second of said planes under the control of the second of said control elements, determining the direction of movement of said transporting means by said rotating member.

6. An arrangement as claimed in claim 5, wherein said variable-position member comprises a swivel plate; wherein said rotating member is a friction wheel; and wherein said longitudinally translatable element is mounted for movement along a rail of U-shaped cross-section, the spacing of the arms of the U being greater than the diameter of the friction wheel; and wherein said swivel plate, when rocked in said second plane, causes said friction wheel to engage one or the other of said arms.

7. An arrangement as claimed in claim 2, wherein between said transporting means and said flap there are provided blocking means, said blocking means being disposed relatively to each other so that said flap can be moved into its actuated position in only said operative position of the transporting means.

8. An arrangement as claimed in claim 7, wherein said blocking means are disposed relatively to each other so that, with said flap in its actuated position, said transporting means are prevented from being moved out of their operative position.

9. An arrangement as claimed in claim 2, wherein separate drive motors are provided for said flap and for said drive spindle.

10. An arrangement as claimed in claim 2, wherein separate drive motors are provided for said flap and said control means, and circuit connections between the last-mentioned motors for controlling the relative time of their operation.

11. In a record-changing apparatus for disk-shaped recording media, having a storage magazine for holding a plurality of said recording media, each contained in a corresponding rectangular sleeve, means for displacing said storage magazine in a direction normal to the planes of said media so as to position one of said recording media in a standby position, and a recording and playback device, said device including a drive spindle having a conically recessed head, a pivotally mounted flap carrying a conically-shaped clamping element cooperating with said head, and actuating means for pivoting said flap with said clamping element thereon from a normal angular position in a direction towards said head to an operative position so as to clamp said recording medium, when in said operative position, against said head and hence into effective driven engagement by said spindle or vice versa, an arrangement for moving said predetermined disk-shaped recording medium between said standby position and said operative position, said arrangement comprising:

means for transporting said recording medium in the plane of said medium from said standby position to said operative position, and vice versa, said plane being at right angles to the plane of motion of said flap, drive means for driving said drive spindle and said transporting means, and control means mechanically interposed between said flap and said transporting means and mechanically actuated by said flap in accordance with the positions assumed by said flap in its pivoting movement, said control means including start-stop means for coupling said transporting means to, and uncoupling said transporting means from, said drive means, as well as direction-control means for conditioning said transporting means for movement in the direction toward, and away from, said operative position.

* * * * *